United States Patent [19]
Horisawa

[11] Patent Number: 5,336,283
[45] Date of Patent: Aug. 9, 1994

[54] PAINT MIST REMOVING APPARATUS

[75] Inventor: Satoshi Horisawa, Tokyo, Japan

[73] Assignee: Taikisha Ltd., Tokyo, Japan

[21] Appl. No.: 77,860

[22] Filed: Jun. 15, 1993

[30] Foreign Application Priority Data

Mar. 10, 1993 [JP] Japan ................ 5-009943[U]

[51] Int. Cl.⁵ .......................................... B01D 47/10
[52] U.S. Cl. ........................................ 55/240; 55/241; 55/276; 55/DIG. 46
[58] Field of Search ............. 55/223, 240, 241, 276, 55/DIG. 46

[56] References Cited

U.S. PATENT DOCUMENTS

| | | | |
|---|---|---|---|
| 3,884,654 | 5/1975 | de Crevoisier et al. | 55/240 X |
| 4,257,784 | 3/1981 | Gebhard et al. | |
| 4,345,921 | 8/1982 | Gustavsson et al. | 55/223 |
| 4,350,506 | 9/1982 | Otto | |
| 4,399,742 | 8/1983 | Dobias | |
| 4,729,775 | 3/1988 | Patte et al. | 55/241 |
| 5,135,550 | 8/1992 | Telchuk et al. | 55/240 X |

FOREIGN PATENT DOCUMENTS 2120576 12/1983 United Kingdom .

Primary Examiner—Charles Hart
Attorney, Agent, or Firm—Webb Ziesenheim Bruening Logsdon Orkin & Hanson

[57] ABSTRACT

A paint mist removing apparatus having a first liquid shooting section formed in a constricted passage of air laden with overspray paint mist. The first liquid shooting section scatters cleaning water from opening edges of a passage inlet of the constricted passage into an air flow passing through said constricted passage. The paint mist removing apparatus further includes an upwardly facing inclined surface for receiving the passing objects under the passage inlet, a downwardly facing surface continuous from a lower edge of the upwardly facing inclined surface, a curved section disposed between the upwardly facing inclined surface and the downwardly facing surface for deflecting the air flowing through the constricted passage toward the downwardly facing surface. The curved section for causing the cleaning water flowing down the upwardly facing inclined surface to scatter again toward the air in the constricted passage under the downwardly facing surface acts as a second liquid shooting section. The present apparatus also provides hollow spaces defined at opposite sides of an air path from the passage inlet under the opening edges of the constricted passage.

7 Claims, 5 Drawing Sheets

PAINT MIST REMOVING APPARATUS

BACKGROUND OF THE INVENTION

1. Field of the Invention

The present invention relates to a paint mist removing apparatus for causing a cleaning liquid to capture and remove overspray paint mist from a gas laden with paint mist, and more particularly to a paint mist removing apparatus comprising an air passage through which a paint mist laden gas flows, a first liquid shooting section for scattering the cleaning liquid from opening edges of a passage inlet toward an air flow through the air passage, an upwardly facing inclined surface for receiving the passing objects under the passage inlet, and a downwardly facing surface continuous from a lower edge of the upward facing inclined surface. The air passage allows the air flow through the air passage to deflect toward the downwardly facing surface through a curved section defined between the upwardly facing inclined surface and the downwardly facing surface. The curved section acts as a second liquid shooting section for scattering again the cleaning liquid flowing down the upwardly facing inclined surface toward the air flow under the downwardly facing surface.

2. Description of the Related Art

An example of paint mist removing apparatus as noted above is shown in FIG. 6. This conventional apparatus allows droplets of a cleaning liquid W scattered from a first liquid shooting section H1 defined by opening edges 17a and 17b disposed at an inlet of an air passage 12 to trap paint mist present in the air A flowing down from the passage inlet 12a above an upwardly facing inclined surface "d", thereby to carry out a first stage of paint mist capture. A curved section "b" defined between the upwardly facing inclined surface "d" and a downwardly facing surface "c" continuous from a lower edge of the upwardly facing surface "d" acts as a second liquid shooting section H2. The cleaning liquid W1 received by the upwardly facing inclined surface "d" is further dispersed from the second liquid shooting section H2 into the air flow through a deflecting passage under the downwardly facing surface "c", thereby to allow droplets of the dispersed cleaning liquid W to further trap paint mist contained in the air A flowing down the downwardly facing surface. Thus, a second stage of paint mist capture is effected. The two-stage paint mist capture assures a high mist capturing efficiency.

Moreover, the second stage of paint mist capture is carried out under the downwardly facing surface disposed in a dead angle position as seen from the passage inlet 12a because of the presence of the upwardly facing inclined surface "d" and the downwardly facing surface "c", thereby to effectively check the noise, i.e. the scattering noise of droplets, produced at the second stage of paint mist capture against leakage toward the passage inlet 12a by the barrier action of the upwardly facing inclined surface and the downwardly facing surface and by the sound absorbing action of the scattered droplets in the first stage paint mist capture. Consequently, the noise leaking from the passage inlet 12a is reduced as a whole.

This conventional apparatus has been proposed by the same assignee in Japanese Patent Application No. 3-310320 (U.S. patent application Ser. No. 07/980,621, filed Nov. 23, 1992). According to this apparatus, as shown in FIG. 6, a hollow space 20 is defined in the air passage at one side of an air path from the passage inlet 12a under the opening edge of the air inlet 12a, while a pendent passage wall 18A' is disposed at an opposite side of the air path, which wall extends from the opening edge 17a acting as the first liquid shooting section H1 to the upwardly facing inclined surface "d".

This proposed apparatus achieves a substantial noise reduction which, however, is not considered sufficient. Thus, there is room for further improvement in reducing the noise.

SUMMARY OF THE INVENTION

A primary object of the present invention is to provide an improved paint mist removing apparatus for effectively achieving a further noise reduction while assuring a high paint mist capturing efficiency.

In order to fulfill the above-noted object, the present invention is characterized by a paint mist removing apparatus comprising a first liquid shooting section formed in the constricted passage of a gas laden with overspray paint mist for scattering cleaning water from opening edges of a passage inlet of the constricted passage into an air flow passing through the constricted passage, an upwardly facing inclined surface for receiving the passing objects under the passage inlet, a downwardly facing surface continuous from a lower edge of the upwardly facing inclined surface, a curved section disposed between the upwardly facing inclined surface and the downwardly facing surface for deflecting the air flowing through the constricted passage toward the downwardly facing surface and acting as a second liquid shooting section for causing the cleaning water flowing down the upwardly facing inclined surface to scatter again toward the air flow under the downwardly facing surface, and hollow spaces defined at opposite sides of an air path from the passage inlet under the opening edges of the passage inlet.

This apparatus has the following functions and effects.

Referring to FIG. 2, the hollow spaces 20A and 20B defined in the constricted passage under the opening edges 17a and 17b of the passage inlet 12a at the opposite sides of the air path from the passage inlet 12a has an effect for reducing the noise by receiving the noise produced in the constricted passage and causing noise components to interfere with one another in both hollow spaces. This provides an effect of reducing the noise leaking from the passage inlet 12a, i.e. a silencer box effect.

According to the prior apparatus shown in FIG. 6 which has the passage wall 18A' pendent from one inlet edge, a substantial amount of direct noise leakage occurs from the constricted passage 12 through the passage inlet 12a. The apparatus of the subject invention can reduce the noise leaking toward the passage inlet 12a more effectively than the prior apparatus shown in FIG. 6. This is due to the hollow spaces 20A and 20B defined under the opening edges of the passage inlet at opposite sides of the air path from the passage inlet 12a.

On the other hand, the apparatus according to the present invention produces the effects equivalent to the prior apparatus shown in FIG. 6 with respect to the aspects that leakage of the noise produced at the second stage of paint mist capture under the downwardly facing surface is prevented by the barrier action of the upwardly facing inclined surface "d" and the downwardly facing surface "c" and by the sound absorbing action of the scattered droplets effecting the first stage paint mist capture, and that the higher paint mist capturing efficiency is assured by the first stage paint mist capture where the cleaning liquid is scattered from the first liquid shooting section H1 and by the second stage paint mist capture where the cleaning liquid is scattered again from the curved section "b" acting as the second liquid shooting section H2.

In brief, according to the present invention, the noise leakage toward the passage inlet is reduced more effectively than the prior apparatus shown in FIG. 6, while assuring a high paint mist capturing efficiency equal to that of the prior apparatus.

FIG. 3 shows a comparison test result between the noise data (1) procured from the paint mist removing apparatus according to the present invention and the noise data (2) procured from the paint mist removing apparatus according to the prior paint mist removing apparatus shown in FIG. 6. As apparent from the graph, the apparatus of the subject invention as indicated in a solid line (1) contributes more effectively to noise reduction than the prior apparatus as indicated in a broken line (2) within a practical range of 100 to 250 mmAq of pressure loss in the cleaning device.

FIG. 4 shows a device used in the above experiment for comparing the apparatus of the present invention to the prior apparatus. The two apparatus were connected to the passage inlet 12a shown in FIG. 4. In either case, the noise was measured by a measuring device K provided in a position as shown in FIG. 5.

Other objects, features and advantages of the present invention will be apparent from the following description referring to the accompanying drawings.

DETAILED DESCRIPTION OF THE PREFERRED EMBODIMENTS

Figure 1:
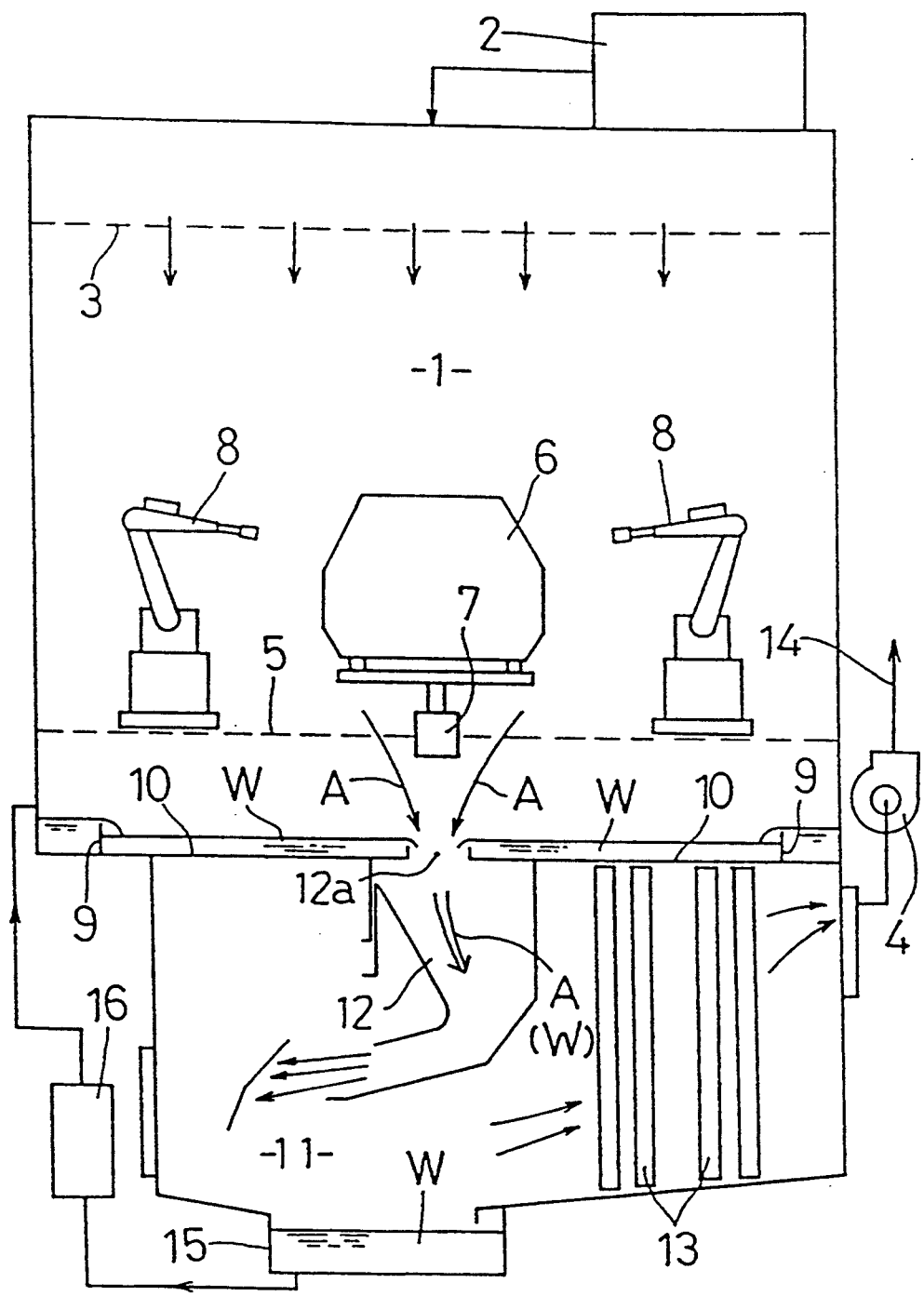
FIG. 1 is a sectional view of a spraying booth according to an embodiment of the present invention.

Embodiments of the present invention will be described in detail referring to the drawings.

FIG. 1 shows a spraying booth including a tunnel-like spraying chamber 1. The spraying chamber 1 has a ceiling defining openings 3 through which ventilating air is supplied from an air conditioner 2 downwardly into the spraying chamber 1. Further, the spraying chamber 1 has a grated floor 5 for allowing interior air A to be exhausted downwardly by suction of an exhaust fan 4. With this ventilating arrangement, overspray paint mist resulting from a spraying operation in the spraying chamber 1 and floating therein is exhausted as entrained by the air A from the spraying chamber 1. Numeral 6 denotes an object under spraying treatment, numeral 7 a conveyor for transporting the object under treatment, and numeral 8 spraying machines.

A pair of cleaning water pans 10 are disposed under the grated floor 5. The pans 10 are constantly filled with cleaning water W overflowing troughs 9. An exhaust chamber 11 is disposed under the cleaning water pans 10. To form an exhaust air passage structure from a region above the cleaning water pans 10 to the exhaust chamber 11, a constricted passage 12 extends longitudinally of the booth, with a slit 12a extending longitudinally of the booth between the cleaning water pans 10 to act as a passage inlet.

The constricted passage 12 provides a paint mist removing apparatus for allowing exhaust air A from spraying chamber 1 to flow at high velocity confluently with the cleaning water W overflowing the pans 10, whereby the cleaning water W captures the overspray paint mist contained in the exhaust air A. The exhaust air A stripped of the paint mist is discharged from the exhaust chamber 11 through a draining device 13, and released through the exhaust fan 4 and an exhaust duct 14.

The cleaning water W having captured the paint mist in the exhaust air A is collected in a return reservoir 15 in the bottom of the exhaust chamber 11. Subsequently, the paint mist is separated and removed from the cleaning water W at an appropriate separating device 16. The cleaning water W stripped of the paint mist is recirculated to the overflow troughs 9 for repeated use.

Figure 2:
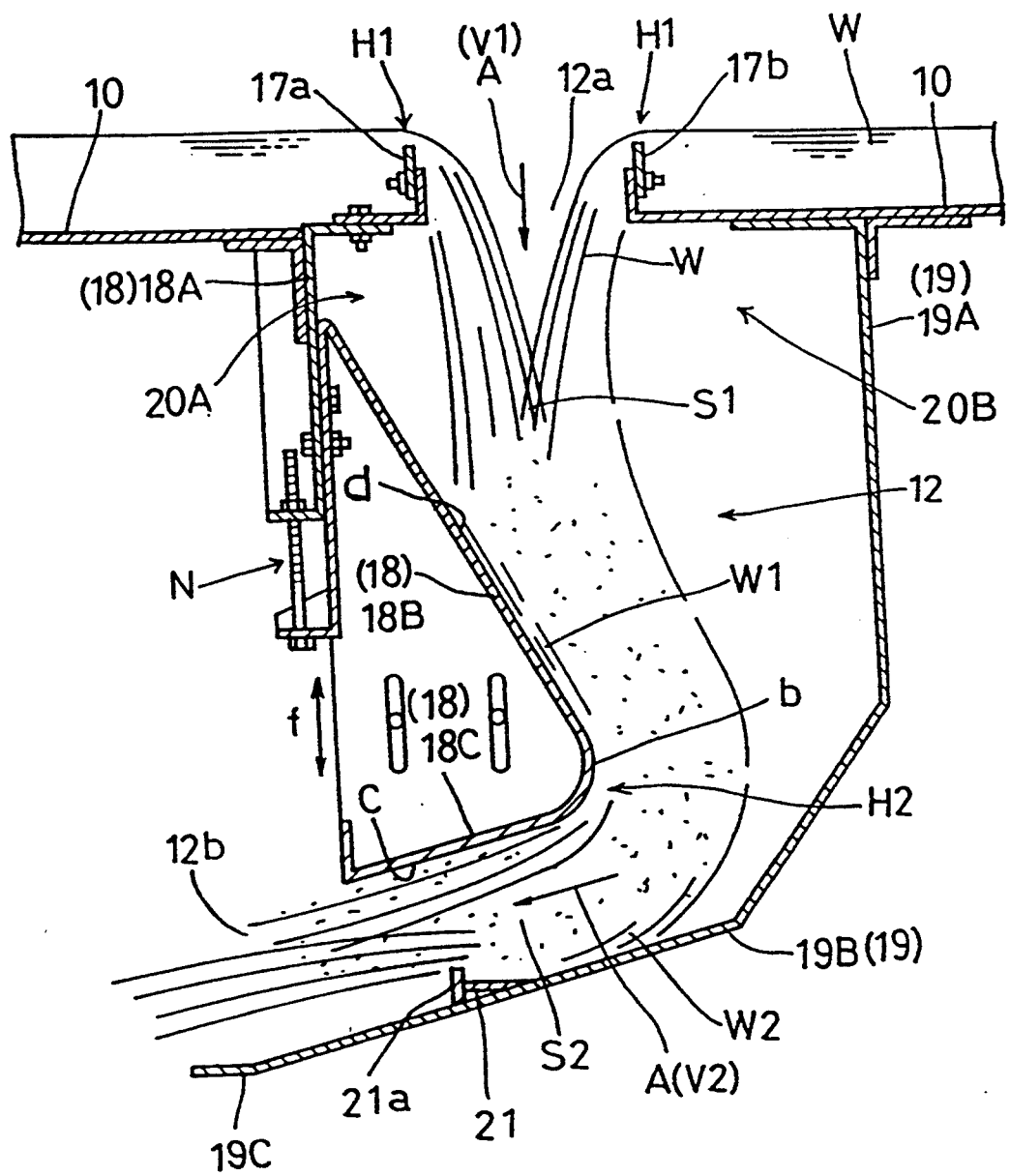
FIG. 2 is an enlarged sectional view of a constricted passage according to the embodiment of the present invention.
Figure 3:
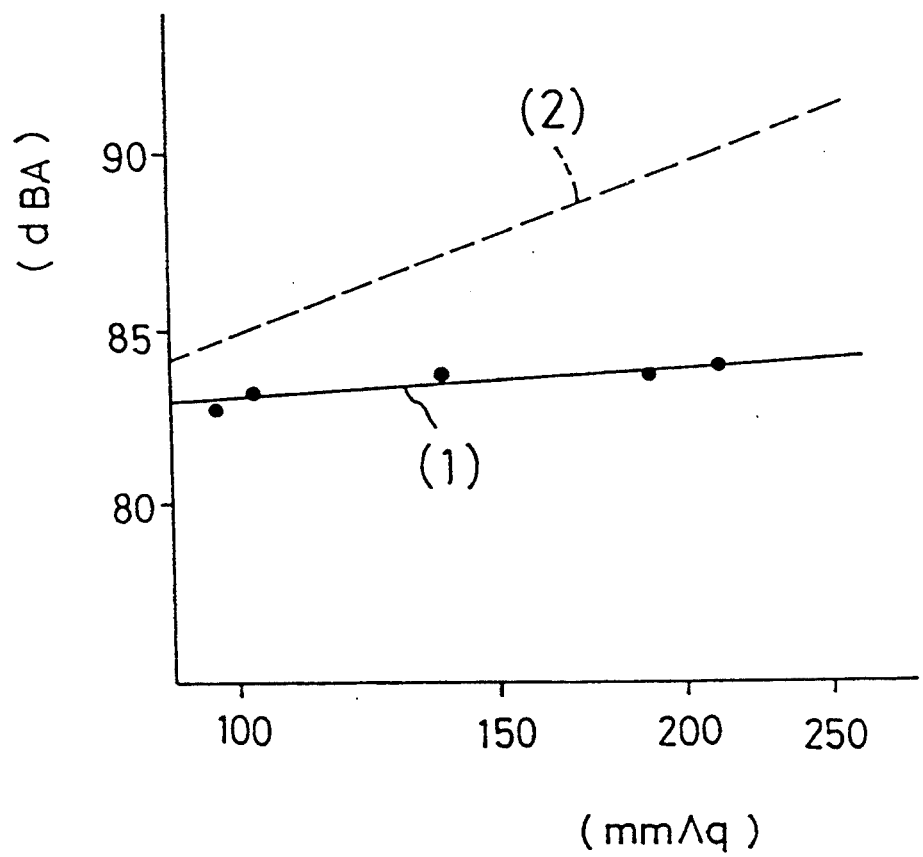
FIG. 3 is a graph showing experimental data.
Figure 4:
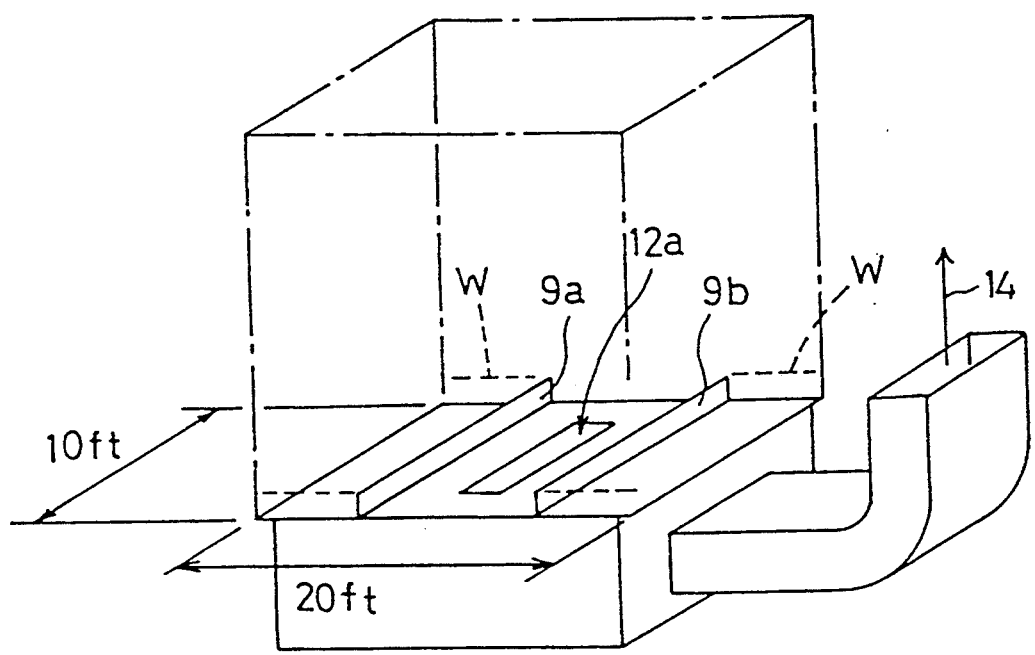
FIG. 4 is a perspective view showing an experimental device.
Figure 5:
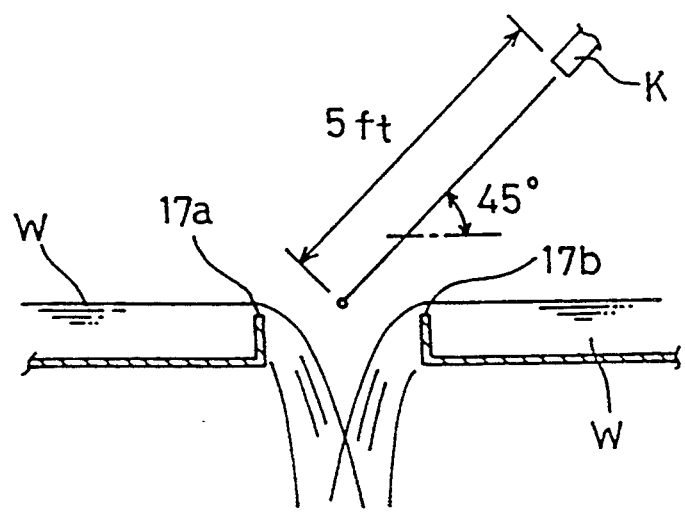
FIG. 5 is an enlarged view showing a position of a measuring device used in the experiment.
Figure 6:
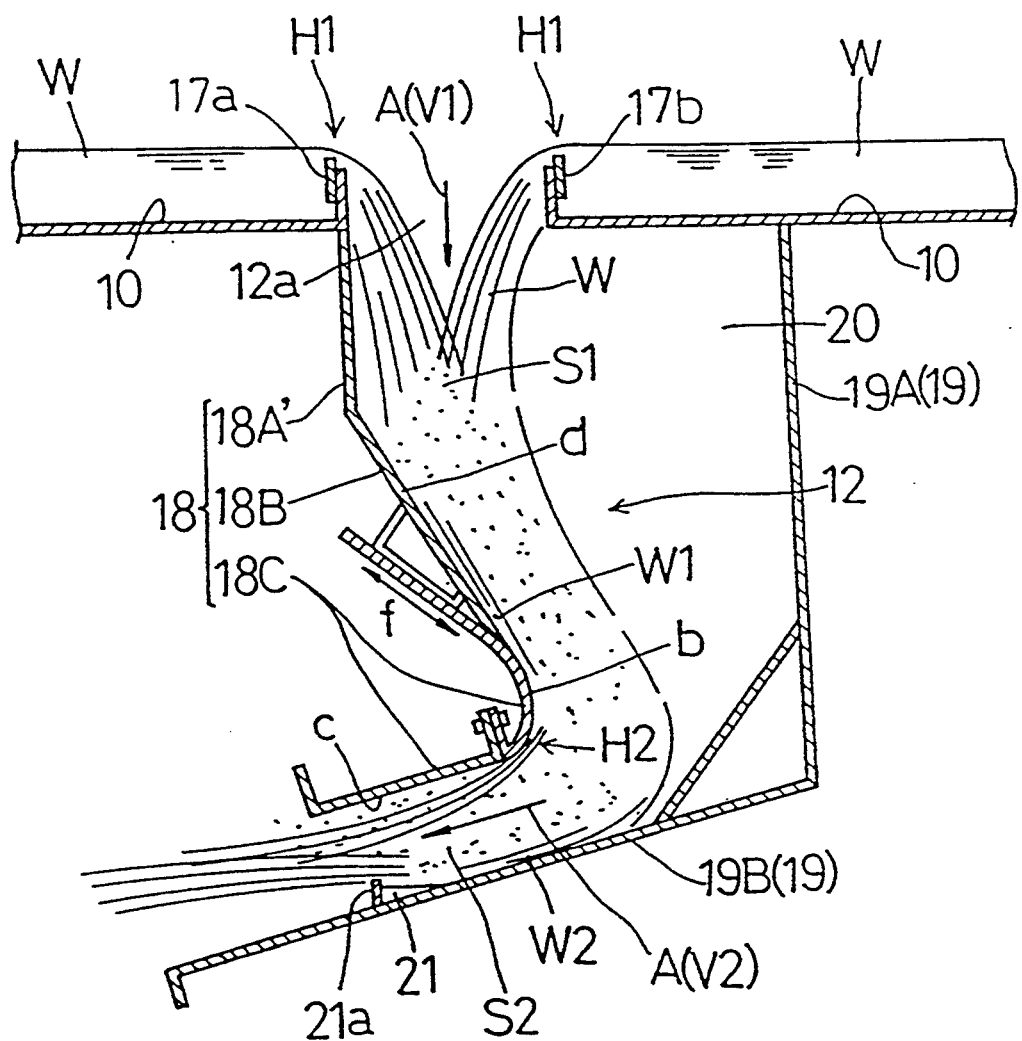
FIG. 6 is a sectional view showing a conventional apparatus.

FIG. 2 shows a specific construction of the constricted passage 12. The constricted passage 12 includes a first cleaning region S1 formed immediately under the passage inlet 12a. Each of the water pans 10 includes overflow a barrier 17a or 17b opposed to the passage inlet 12a to act as a first water shooting section H1 leading to the first cleaning region S1. The cleaning water W is allowed to scatter from the first water shooting section H1 toward the first cleaning region S1, becoming fine droplets in the air A flowing down from the passage inlet 12a.

Thus, the first cleaning region S1 in the constricted passage defines a droplet thick region where the cleaning water W scatters from the first water shooting region H1 in fine droplets. Consequently, a first stage of paint mist capture is effected in the first cleaning region whereby the droplets trap paint mist contained in the air A flowing down the passage 12.

One side wall 18 of the constricted passage 12 includes an upper wall portion 18A extending vertically from the passage inlet 12a to the first cleaning region S1. The upper wall portion 18A is pendent from a position of a bottom surface of the water pan 10 displaced outwardly of one of the opening edges, i.e. the overflow barrier 17a of the passage inlet 12a. On the other hand, lower wall portions 18B and 18C are disposed below the first cleaning region S1 and form a substantially L-shaped curved section protruding inwardly of the constricted passage. As a result, the droplets having captured paint mist in the first cleaning region S1 are received by the side wall 18 below the first cleaning region S1. The droplets received by the side wall 18 collect into water W1 which flows down an upwardly facing inclined surface "d" at high velocity with the air flowing through the constricted passage 12 at high velocity. Further, the upwardly facing inclined surface "d" is continuous at a lower end thereof to a curved section "b" from which a downwardly facing surface "c" extends forwardly and downwardly.

The other side wall 19 of the constricted passage 12 includes an upstream wall portion 19A pendent from a position of a bottom surface of the water pan 10 displaced outwardly of the other opening edge, i.e. the overflow barrier 17b of the passage inlet 12a. The other side wall 19 further includes a downstream wall portion 19B extending forwardly and downwardly and substantially parallel to the downwardly facing surface "c" opposed thereto. Thus, the constricted passage 12 has a downstream portion inclined forwardly and downwardly, so that the air A is deflected around the curved section "b" toward the downwardly facing surface "c".

As noted above, the passage structure downstream of the first cleaning region deflects the air A flowing through the passage around the curved section "b" toward the downwardly facing surface "c". As a result, the cleaning water W1 flowing down from the upwardly facing inclined surface "d" is separated from the curved section "b" to scatter in fine droplets in the air A flowing through the constricted passage 12 toward a second cleaning region S2 below the downwardly facing surface "c". Thus, the second cleaning region S2 defines a further droplet thick region similar to the upstream first cleaning region S1, with the curved section "b" acting as a second water shooting section H2 for the second cleaning region S2 formed below the downwardly facing surface "c". Consequently, a second stage of paint mist capture is effected in the second cleaning region S2 inside the constricted passage 12 following the first stage paint mist capture carried out in the upstream position, whereby the droplets trap the paint mist remaining in the flowing air A.

According to the above passage structure, because of the presence of the upwardly facing inclined surface "d" and the downwardly facing surface "c", the constricted passage 12 downstream of the curved section "b" is disposed at a dead angle position as seem from the first cleaning region S1 and the passage inlet 12a thereabove. Moreover, numerous droplets formed in the first cleaning region S1, with the excellent sound absorbing capacity inherent to the droplets, damp the noise produced in the constricted passage downstream of the curved section "b". As a result, the noise (mainly noise of scattering water) produced in the constricted passage 40 downstream of the curved section "b" at the second stage paint mist capture is checked against leakage to the passage inlet 12a.

Further, the upper portions 18A and 19A of the opposite side walls 18 and 19 are pendent from the bottom surfaces of the water pans 10 and outwardly of the opposite opening edges (i.e. the opposite overflow barriers 17a and 17b) of the passage inlet 12a, whereby hollow spaces 20A and 20B are formed in the constricted passage at opposite lateral sides of the air flow from the passage inlet 12a. These hollow spaces 20A and 20B have a sound absorbing effect, i.e. to receive noise produced in the constricted passage 12 and damp the noise through mutual interference among components of the noise within the hollow spaces 20A and 20B. As a result, these hollow spaces also contribute toward suppression of the noise leaking from the passage inlet 12a to the spraying chamber 1. The two stages of paint mist capture assure a high mist capturing efficiency as a whole, while effectively reducing noise leakage from the constricted passage 12 to the spraying chamber 1 to improve working environment in the spraying chamber 1.

The constricted passage 12 has a smaller sectional area in the region of the curved section "b" acting as the second water shooting section H2 than in the region of the first water shooting section H1 disposed at the passage inlet 12a. Consequently, the air flows past the second water shooting section H2 at a velocity V2 which is higher than a velocity V1 at which the air flows past the first water shooting section H1. The cleaning water W is scattered in finer droplets from the second water shooting section H2 than from the first water shooting section H1. At the first stage of paint mist capture, the less fine droplets trap relatively large particles of paint mist. At the second stage of paint mist capture, the finer droplets trap small particles of paint mist remaining in the air A. Thus, a wide range of mist particles in the flowing air A may be trapped reliably.

With the above setting of air flow velocities, greater noise is produced at the second stage of paint mist capture than at the first stage. As noted hereinbefore, the noise produced in the constricted passage 12 downstream of the curved section "b" at the second stage of paint mist capture is checked against leakage to the passage inlet 12a by the barrier action of the upwardly facing inclined surface "d" and downwardly facing surface "c" and by the sound absorbing action of the droplets in the first cleaning region S1. This produces the effect of reducing overall noise leakage to the spraying chamber 1.

The upper portion 18A of one side wall 18 which is pendent from the position of the bottom surface of the water pan 10 displaced outwardly of one of the opening edges of the passage inlet 12a is a fixed wall portion. On the other hand, the lower portions 18B and 18C including the upwardly facing inclined surface "d", the curved section "b" and the downwardly facing surface "c" are vertically adjustable as indicated by arrow "f" in FIG. 2 through a screw mechanism N. This positional adjustment allows the air velocity V2 through the second cleaning region S2 to be suitably adjusted according to operating conditions and the like.

The overflow barriers 17a and 17b constituting the first water shooting section H1 have an adjustable height. Through this height adjustment, the cleaning water W is scattered from the first water shooting section H1 into the constricted passage 12 in varied forms to appropriately adjust mist capturing conditions in the first cleaning region S1.

Numeral 21 in FIG. 2 denotes a step formed on the downstream portion 19B of the other side wall 19. Part of the droplets carried by the air A from the first cleaning region S1 collide with the forwardly inclined downstream portion 19B of the other side wall 19, without being received by the upwardly facing inclined surface "d", to collect into water W2. This water W2 flows down the downstream wall portion 18B at high velocity with the air A flowing at high velocity. The step 21 causes the downflowing water W2 to scatter in fine droplets again upward into the air A flowing through the constricted passage 12. The mist capturing efficiency is promoted further as a whole, since the cleaning water W2 reaching the downstream portion 19B of the other side wall 19 without being received by the upwardly facing inclined surface "d" is scattered again by the step 21 in addition to the cleaning water W1 flowing down the upwardly facing inclined surface "d" being scattered by the curved section "b" acting as the second water shooting section H2.

The position of the step 21 on the downstream wall portion 19B may be selected according to a target position to which the cleaning water W2 is scattered. For example, the step 21 may be located to scatter the cleaning water W2 to a position upstream or downstream of the second cleaning region S2 to which the cleaning water W1 is scattered from the second water shooting section H2. The step 21 may scatter the cleaning water W2 to a position just outside an outlet 12b of the constricted passage 12. Further, the step 21 may scatter the cleaning water W2 right into the second cleaning region S2, so that the step 21 and curved section "b" combine to act as the second water shooting section H2 for the second cleaning region S2.

An upstanding piece 21a is disposed at a forward end of the step 21 to promote scattering of the cleaning water W2. However, the upstanding piece 21a may be omitted where appropriate.

The downstream portion 19B includes a forward end portion 19C defining a lower edge of an outlet 12b of the constricted passage 12. The forward end portion 19C is substantially horizontal, while the downstream portion 19B is inclined forwardly and downwardly. This arrangement deflects the discharged objects, particularly the cleaning water from the outlet 12b of the constricted passage 12, upwardly from a forward and downward direction toward a horizontal direction. The upward deflection prevents the cleaning water from becoming droplets at the lower edge of the outlet 12b of the constricted passage 12 and scattering toward the draining device 13 as entrained by the air flow.

Modified embodiments of the invention will be set forth below.

The specific configurations and dimensions of the hollow spaces 20A and 20B formed in the constricted passage at the opposite sides of the air flow path from the passage inlet 12a may be modified in various ways instead of being limited to the configurations and measurements as shown in FIG. 2.

The inclination angle of the upwardly facing inclined surface "d" and the curvature of the curved section "b" may be determined suitably. Where appropriate, the upwardly facing inclined surface "d" may be in the form of an upwardly or downwardly curved surface instead of being flat. The curved section "b" may be angular instead of being round. Thus, the upwardly facing inclined surface "d" and curved section "b" may also be varied in many ways.

The angle and length of the downwardly facing surface "c" may be determined suitably. Where appropriate, the downwardly facing surface "c" may also be in the form of an upwardly and downwardly curved surface instead of being flat.

The cleaning water W may be an aqueous solution of a chemical substance or one of various liquid substances.

The hollow spaces 20A and 20B may include pleated plates or netting to enhance the sound absorbing effect.

What is claimed is:

1. A paint mist removing apparatus comprising:
   a first liquid shooting section formed in a constricted passage, said first liquid shooting section scattering cleaning water from opening edges of a passage inlet of the constricted passage into a gas flow passing through said constricted passage;
   one side wall including:
   an upwardly facing inclined surface disposed under the passage inlet,
   a downwardly facing surface continuous from a lower edge of said upwardly facing inclined surface, and
   a curved section disposed between said upwardly facing inclined surface and said downwardly facing surface for deflecting the gas flowing through said constricted passage toward said downwardly facing surface;
   a second liquid shooting section, which includes said curved section, for causing the cleaning water flowing down said upwardly facing inclined surface to scatter again toward the gas in the constricted passage under the downwardly facing surface;
   hollow spaces defined at opposite sides of a gas path from the passage inlet under the opening edges of the constricted passage; and
   a first cleaning region formed substantially immediately under the passage inlet, said first cleaning region defining a droplet thick region where the cleaning water scatters from said first liquid shooting section in fine droplets;
   wherein said first liquid shooting section includes overflow barriers defined at the opening edges of the passage inlet between cleaning water pans and the constricted passage,
   wherein said constricted passage includes said one side wall and an other side wall, said one side wall having a lower wall portion, an upper wall portion vertically extending from the passage inlet to said first cleaning region and pendent from a bottom portion of a first water pan displaced outwardly on one of said overflow barriers, said one side wall further having downstream wall portions with a substantially L-shaped section protruding inwardly of said constricted passage, said other side wall having an upper wall portion pendent from a bottom portion of a second water pan displaced outwardly of a second of said overflow barriers, said other wall further having a downstream wall portion inclined forwardly and downwardly to be substantially parallel to said downwardly facing surface,
   wherein said lower wall portion of said one side wall includes said upwardly facing inclined surface, said curved section and said downwardly facing surface and is vertically adjustable as a unit along said upper wall portion, and
   wherein said hollow spaces are defined by the upper wall portions of the side walls of the constricted passage and by the bottom portions of the cleaning water pans.

2. A paint mist removing apparatus as claimed in claim 1 wherein said lower wall portion of said one side wall is vertically adjustable through a screw mechanism.

3. A paint mist removing apparatus as claimed in claim 1 wherein said downstream portion of said other side wall includes a forward end portion arranged in a substantially horizontal position to deflect the cleaning water toward an upper direction.

4. A paint mist removing apparatus as claimed in claim 1 wherein said overflow barriers forming the first liquid shooting section are adjustable in height.

5. A paint mist removing apparatus as claimed in claim 1 wherein said constricted passage has a smaller sectional area in the region of said curved section acting as the second liquid shooting section than in the region of the first liquid shooting section disposed at the passage inlet.

6. A paint mist removing apparatus as claimed in claim 1 wherein said constricted passage includes a step formed on said downstream portion of the other side wall with which part of the scattered droplets collide to collect into water, said step causing the collected water to scatter in fine droplets again upward into the gas flowing through the constricted passage.

7. A paint mist removing apparatus as claimed in claim 6 wherein said step includes an upstanding piece disposed at a forward end thereof to promote scattering of the collected water.

* * * * *

UNITED STATES PATENT AND TRADEMARK OFFICE
CERTIFICATE OF CORRECTION

PATENT NO. : 5,336,283
DATED : August 9, 1994
INVENTOR(S) : Satoshi Horisawa

It is certified that error appears in the above-indentified patent and that said Letters Patent is hereby corrected as shown below:

Title page, item [56], under References Cited, FOREIGN PATENT DOCUMENTS, insert --3-310320 11/1926 Japan .--.

Column 4 Line 30 after "overflow" delete "a".

Column 5 Line 33 "seem" should read --seen--.

Signed and Sealed this

Eighteenth Day of October, 1994

Attest:

BRUCE LEHMAN

*Attesting Officer*   *Commissioner of Patents and Trademarks*